(12) United States Patent
Lee et al.

(10) Patent No.: US 11,485,252 B2
(45) Date of Patent: Nov. 1, 2022

(54) THERMAL MANAGEMENT SYSTEM OF VEHICLE ELECTRIC POWER SYSTEM

(71) Applicants: HYUNDAI MOTOR COMPANY, Seoul (KR); KIA MOTORS CORPORATION, Seoul (KR)

(72) Inventors: Gun Goo Lee, Suwon-si (KR); Seung Woo Yang, Goyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 23 days.

(21) Appl. No.: 17/116,780

(22) Filed: Dec. 9, 2020

(65) Prior Publication Data

US 2022/0009378 A1 Jan. 13, 2022

(30) Foreign Application Priority Data

Jul. 9, 2020 (KR) ........................ 10-2020-0084667

(51) Int. Cl.
*B60L 58/26* (2019.01)
*H01M 10/613* (2014.01)
*H01M 10/6568* (2014.01)
*H01M 10/625* (2014.01)

(52) U.S. Cl.
CPC .......... *B60L 58/26* (2019.02); *H01M 10/613* (2015.04); *H01M 10/625* (2015.04); *H01M 10/6568* (2015.04); *H01M 2220/20* (2013.01)

(58) Field of Classification Search
CPC ... B60L 58/26; H01M 10/613; H01M 10/625; H01M 10/6558; H01M 2220/20; B60H 1/004; B60H 1/00571; B60H 1/00885; B60H 1/00278; B60H 1/03; B60H 1/034; B60H 1/0143; B60H 2001/00307; B60H 2001/00928; B60H 2001/00942; B60H 2001/00949; B60Y 2200/91; B60Y 2306/05; F01P 5/10; F01P 7/16; F01P 11/029; F01P 2007/146; F01P 2050/22; F01P 2060/18
USPC .................................................. 165/43, 202
See application file for complete search history.

(56) References Cited

U.S. PATENT DOCUMENTS

| | | | | |
|---|---|---|---|---|
| 6,640,889 | B1 * | 11/2003 | Harte | B60H 1/32284 62/238.7 |
| 8,336,319 | B2 * | 12/2012 | Johnston | B60L 3/0046 62/434 |
| 8,402,776 | B2 * | 3/2013 | Johnston | B60L 58/26 62/79 |
| 9,533,546 | B2 * | 1/2017 | Cheng | H01M 10/6568 |
| 10,286,774 | B2 * | 5/2019 | Janarthanam | B60K 11/04 |
| 10,293,706 | B2 * | 5/2019 | Porras | B60L 58/26 |

(Continued)

FOREIGN PATENT DOCUMENTS

GB 2374659 A * 10/2002 ............. B60H 1/025

*Primary Examiner* — Len Tran
*Assistant Examiner* — Gustavo A Hincapie Serna
(74) *Attorney, Agent, or Firm* — Lempia Summerfield Katz LLC

(57) ABSTRACT

A thermal management system of a vehicle electric power system allows a production cost of a system to be reduced by reducing the number of three-way valves when compared to a conventional system and, simultaneously, is capable of implementing cooling and heating performances equivalent to those of the conventional system.

16 Claims, 3 Drawing Sheets

(56) References Cited

U.S. PATENT DOCUMENTS

| | | | | |
|---|---|---|---|---|
| 2011/0296855 | A1* | 12/2011 | Johnston | B60L 1/02 |
| | | | | 62/160 |
| 2012/0183815 | A1* | 7/2012 | Johnston | B60L 58/27 |
| | | | | 429/50 |
| 2012/0205088 | A1* | 8/2012 | Morisita | B60L 1/02 |
| | | | | 62/243 |
| 2012/0225341 | A1* | 9/2012 | Major | B60L 3/003 |
| | | | | 429/120 |
| 2017/0158081 | A1* | 6/2017 | Kim | B60H 1/00278 |
| 2018/0111443 | A1* | 4/2018 | Kim | B60H 1/00485 |
| 2018/0117985 | A1* | 5/2018 | Kim | B60H 3/024 |
| 2018/0117986 | A1* | 5/2018 | Kim | B60K 1/04 |
| 2018/0117991 | A1* | 5/2018 | Kim | B60H 1/00385 |
| 2019/0039439 | A1* | 2/2019 | Aldridge | B60H 1/323 |
| 2019/0070924 | A1* | 3/2019 | Mancini | B60H 1/00564 |
| 2019/0070951 | A1* | 3/2019 | Lucke | B60H 1/3204 |
| 2019/0135075 | A1* | 5/2019 | Hwang | B60H 1/00921 |
| 2019/0190095 | A1* | 6/2019 | Park | B60L 58/26 |
| 2019/0381857 | A1* | 12/2019 | Lee | B60H 1/00278 |
| 2020/0254848 | A1* | 8/2020 | Semel | F25D 21/006 |
| 2020/0274210 | A1* | 8/2020 | Bae | H01M 10/613 |
| 2021/0016632 | A1* | 1/2021 | Oh | H01M 10/6568 |

* cited by examiner

THERMAL MANAGEMENT SYSTEM OF VEHICLE ELECTRIC POWER SYSTEM

CROSS-REFERENCE TO RELATED APPLICATION

This application claims priority to and the benefit of Korean Patent Application No. 10-2020-0084667, filed on Jul. 9, 2020, the entire contents of which are incorporated herein by reference.

FIELD

The present disclosure relates to a thermal management system of a vehicle electric power system.

BACKGROUND

The statements in this section merely provide background information related to the present disclosure and may not constitute prior art.

Generally, an electric vehicle is equipped with a thermal management system using cooling water for thermal management of an electric power system, which provides a driving force of a vehicle. The thermal management system is configured to be capable of managing heat of the electric power system by cooling or heating cooling water circulating in the electric power system.

A conventional thermal management system includes a reservoir tank for storing cooling water, a radiator and a chiller for cooling the cooling water, a cooling water heater for heating the cooling water, two electronic water pumps for pressure-transferring the cooling water, a thermal management circuit formed of a combination of two three-way valves for controlling a flow of the cooling water, and a controller for controlling a temperature of the cooling water of the thermal management circuit and controlling a flow of the cooling water.

The thermal management system may control temperatures of an electric power system component and a battery system by circulating the cooling water in cooling water passages of the electric power system component for driving the vehicle and the battery system providing electric power to the electric power system component.

In addition, the thermal management system separates the electric power system component from the battery system to individually cool the electric power system component and the battery system as desired or integrally cools the electric power system component and the battery system.

To this end, the thermal management system controls operations of two three-way valves to determine a flow direction of the cooling water.

However, the three-way valve is an expensive component when compared to a general one-way valve.

SUMMARY

The present disclosure provides a thermal management system of a vehicle electric power system, which allows a production cost of a system to be reduced by reducing the number of three-way valves when compared to a conventional system and, simultaneously, is capable of implementing cooling and heating performances equivalent to those of the conventional system.

In one form, the present disclosure provides a thermal management system of a vehicle electric power system, which includes a first passage including a fifth passage and a sixth passage that are defined based on a first position and a second position of a cooling water flow direction, wherein an electric power system component, a radiator, and a first water pump are disposed in the fifth passage; a second passage including a seventh passage and an eighth passage that are defined based on a first position and a second position of a cooling water flow direction, wherein a battery system, a chiller, and a second water pump are disposed in the seventh passage; a third passage configured to connect the first position of the first passage to the first position of the second passage to allow cooling water to flow between the first passage and the second passage; a fourth passage configured to connect the second position of the first passage to the second position of the second passage to allow cooling water to flow between the first passage and the second passage; a three-way valve installed at a connection position between the first passage and the fourth passage and configured to control a cooling water flow direction at the connection position between the first passage and the fourth passage; and a controller configured to control an operation of the three-way valve according to a thermal management mode of an electric power system so as to determine the cooling water flow direction of the three-way valve at the connection position between the first passage and the fourth passage.

According to one form of the present disclosure, the first passage may be configured to allow the cooling water to circulate to the electric power system component and the radiator due to the first water pump, and a reservoir tank configured to store the cooling water may be installed in the fifth passage. In addition, the second passage may be configured to allow the cooling water to circulate to the battery system and the chiller due to the second water pump, and a cooling water heater configured to heat the cooling water may be installed in the seventh passage. In addition, the thermal management system may further include a tenth passage branching off from the eighth passage to be connected to the reservoir tank, and a one-way valve configured to control a flow of the cooling water between the eighth passage and the reservoir tank may be installed in the tenth passage. In addition, the three-way valve may include a first port communicating with the fifth passage, a second port communicating with the sixth passage, and a third port communicating with the fourth passage.

Further, according to one form of the present disclosure, the thermal management mode of the electric power system may be divided into an integrated mode and a separation mode, and when the three-way valve is controlled in the integrated mode, the three-way valve may open the first port and the third port and close the second port. When the first port and the third port are opened and the second port is closed, a flow of the cooling water may be allowed from the first position of the second passage to the first position of the first passage, and a flow of the cooling water may be allowed from the second position of the first passage to the second position of the second passage. In addition, when the first port and the third port are opened and the second port is closed, the flow of the cooling water may branch off from the first position of the second passage to the eighth passage.

In addition, when the three-way valve is controlled in the separation mode, the three-way valve may open the first port and the second port and close the third port. When the first port and the second port are opened and the third port is closed, a flow of the cooling water may not occur in the third passage and the fourth passage.

Further, according to one form of the present disclosure, when the three-way valve is controlled in the integrated mode or the separation mode, the controller may operate the one-way valve to be closed to block the flow of the cooling water in the tenth passage. Further, when the cooling water is injected into the reservoir tank, the controller may operate the one-way valve to be opened to allow the flow of the cooling water in the tenth passage.

Further, according to one form of the present disclosure, when the three-way valve is controlled in the integrated mode, the controller may control a speed of the first water pump with a speed value obtained by adding a set reference speed to a speed of the second water pump, and when the three-way valve is controlled in the separation mode, the controller may individually control the speed of the first water pump and the speed of the second water pump.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The above and other features of the present disclosure will now be described in detail with reference to certain exemplary forms thereof illustrated in the accompanying drawings which are given herein below by way of illustration only, and thus are not limitative of the present disclosure, and wherein.

Figure 1:
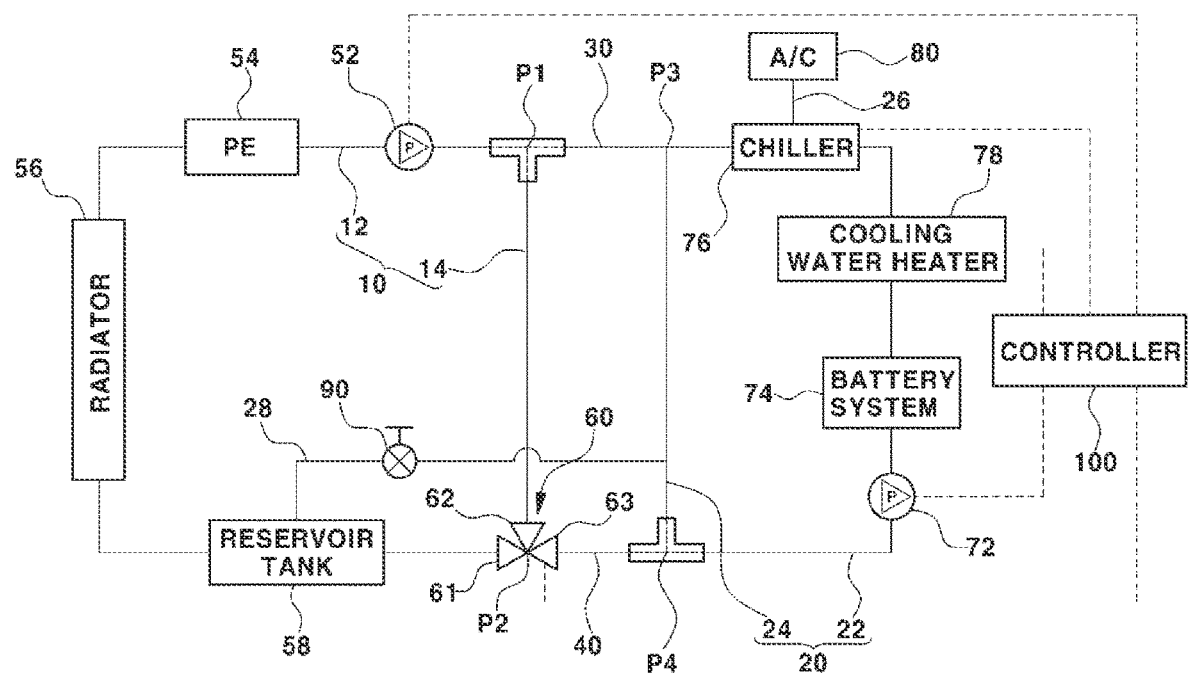
FIG. 1 is a block diagram illustrating a thermal management system of a vehicle electric power system according to one form of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various forms of the present disclosure will be described in detail with reference to the accompanying drawings. Items shown in the drawings are schematically illustrated so as to easily describe various forms of the present disclosure, and thus the items may be different from those actually implemented.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. FIG. 1 is a diagram illustrating a configuration of a thermal management system of a vehicle electric power system according to one form of the present disclosure.

The thermal management system of the present disclosure is a system which performs thermal management of a vehicle electric power system using cooling water. As shown in FIG. 1, the thermal management system is configured to be capable of managing heat of the electric power system by cooling or heating cooling water circulating in the vehicle electric power system.

The vehicle electric power system includes an electric power system component 54 for providing a driving force and a battery system 74 for providing electric power to the electric power system component 54. Specifically, the electric power system component 54 may include a motor for driving a vehicle and a power conversion device for converting electric power supplied to the motor. In addition, the electric power system component 54 is also referred to as a power electric (PE) component. The battery system 74 includes a battery which provides vehicle driving electric power.

The thermal management system may include passages through which cooling water may circulate to the electric power system component 54 and the battery system 74, and members for adjusting a temperature of the cooling water and controlling a flow thereof.

The passages of the thermal management system include a first passage 10, a second passage 20, a third passage 30, and a fourth passage 40.

The first passage 10 is a passage formed in a closed loop form and is configured such that the cooling water circulates to flow in the electric power system component 54 and a radiator 56 due to a first water pump 52.

The electric power system component 54 may be disposed in the first passage 10 and cooled or heated by the cooling water flowing in the first passage 10.

The radiator 56 is configured to cool the cooling water through heat exchange with outdoor air of the vehicle.

The first water pump 52 is installed in the first passage 10 and serves to allow the cooling water to flow in the first passage 10. The first water pump 52 is an electric water pump to which electric control is applicable.

The cooling water press-transferred by the first water pump 52 circulates in the first passage 10 to allow thermal management of the electric power system component 54.

In addition, a reservoir tank 58, in which cooling water is stored, may be disposed in the first passage 10. The first water pump 52 pumps the cooling water in the reservoir tank 58 to allow the cooling water to flow in the first passage 10.

Referring to FIG. 1, the first passage 10 may be configured such that the cooling water circulates in the order of the first water pump 52, the electric power system component 54, the radiator 56, and the reservoir tank 58.

The second passage 20 is a passage formed in a closed loop form and is configured such that the cooling water circulates to flow in the battery system 74 and a chiller 76 due to a second water pump 72.

The battery system 74 may be disposed in the second passage 20 and cooled or heated by the cooling water flowing in the second passage 20.

The chiller 76 is configured to cool the cooling water using a refrigerant. Specifically, the chiller 76 may cool the cooling water using a refrigerant of a vehicle air conditioning device 80. The air conditioning device 80 may be connected to the chiller 76 through a ninth passage 26.

The second water pump 72 is installed in the second passage 20 and serves to allow the cooling water to flow in the second passage 20. The second water pump 72 is an electric water pump to which electric control is applicable.

The cooling water press-transferred by the second water pump 72 circulates in the second passage 20 to allow thermal management of the battery system 74.

In addition, a cooling water heater 78 for heating the cooling water may be installed in the second passage 20.

Referring to FIG. 1, the second passage 20 may be configured such that the cooling water circulates in the order of the second water pump 72, the battery system 74, the cooling water heater 78, and the chiller 76.

The first passage 10 may be connected to the second passage 20 through the third passage 30 and the fourth passage 40.

The third passage 30 is formed to connect a first position P1 of the first passage 10 to a first position P3 of the second passage 20 to allow the cooling water to flow between the first passage 10 and the second passage 20.

A flow of the cooling water may occur in the third passage 30 according to a pressure transferring direction of the cooling water due to the water pump 52 and 72. Specifically, in the third passage 30, a flow of the cooling water may occur from the second passage 20 to the first passage 10 according to the pressure transferring direction of the cooling water due to the first water pump 52 and the second water pump 72. When the pressure transferring direction of the cooling water due to the water pumps 52 and 72 is changed, a flow of the cooling water flowing from the first position P1 of the first passage 10 to the first position P3 of the second passage 20 may also occur.

Referring to FIG. 1, the first position P1 of the first passage 10 may be one position between the first water pump 52 and the reservoir tank 58. Specifically, when the cooling water flows in the order of the electric power system component 54, the radiator 56, and the reservoir tank 58 from the first water pump 52, the first position P1 of the first passage 10 may be one position between a front end of the first water pump 52 and a rear end of the reservoir tank 58 based on a cooling water flow direction.

In addition, the first position P3 of the second passage 20 may be one position between the second water pump 72 and the chiller 76. Specifically, when the cooling water flows in the order of the battery system 74, the cooling water heater 78, and the chiller 76 from the second water pump 72, the first position P3 of the second passage 20 may be one position between a front end of the second water pump 72 and a rear end of the chiller 76 based on a cooling water flow direction.

The fourth passage 40 is formed to connect a second position P2 of the first passage 10 to a second position P4 of the second passage 20 to allow the cooling water to flow between the first passage 10 and the second passage 20.

A flow of the cooling water may occur in the fourth passage 40 according to a pressure transferring direction of the cooling water due to the water pump 52 and 72. Specifically, in the fourth passage 40, a flow of the cooling water may occur from the first passage 10 to the second passage 20 according to the pressure transferring direction of the cooling water due to the first water pump 52 and the second water pump 72. In addition, when the pressure transferring direction of the cooling water due to the water pumps 52 and 72 is changed, a flow of the cooling water flowing from the second position P4 of the second passage 20 to the second position P2 of the first passage 10 may also occur in the fourth passage 40.

Referring to FIG. 1, the second position P2 of the first passage 10 may be one position between the first position P1 of the first passage 10 and the reservoir tank 58. Specifically, when the cooling water flows in the order of the electric power system component 54, the radiator 56, and the reservoir tank 58 from the first water pump 52, the second position P2 of the first passage 10 may be one position between the first position P1 of the first passage 10 and a rear end of the reservoir tank 58 based on the cooling water flow direction.

In addition, the second position P4 of the second passage 20 may be one position between the first position P3 of the second passage 20 and the second water pump 72. Specifically, when the cooling water flows in the order of the battery system 74, the cooling water heater 78, and the chiller 76 from the second water pump 72, the second position P4 of the second passage 20 may be one position between a front end of the second water pump 72 and the first position P3 of the second passage 20 based on the cooling water flow direction.

In addition, the first passage 10 may be divided into a fifth passage 12 and a sixth passage 14 based on the first position P1 and the second position P2. That is, the first passage 10 may be formed of the fifth passage 12 and the sixth passage 14 which are defined based on the first position P1 and the second position P2.

Specifically, based on the first position P1 and the second position P2 of the first passage 10, the fifth passage 12 is a portion in which the first water pump 52, the electric power system component 54, the radiator 56, and the reservoir tank 58 are disposed, and the sixth passage 14 is a portion in which the first water pump 52, the electric power system component 54, the radiator 56, and the reservoir tank 58 are not disposed.

In other words, the first passage 10 may be configured of the fifth passage 12 in which the first water pump 52, the electric power system component 54, the radiator 56, and the reservoir tank 58 are disposed, and the sixth passage 14 connected to the fifth passage 12 at the first position P1 and the second position P2 of the first passage 10.

In addition, the second passage 20 may be divided into a seventh passage 22 and an eighth passage 24 based on the first position P3 and the second position P4. That is, the second passage 20 may be formed of the seventh passage 22 and the eighth passage 24 which are defined based on the first position P3 and the second position P4.

Specifically, based on the first position P3 and the second position P4 of the second passage 20, the seventh passage 22 is a portion in which the second water pump 72, the battery system 74, the cooling water heater 78, and the chiller 76 are disposed, and the eighth passage 24 is a portion in which the second water pump 72, the battery system 74, the cooling water heater 78, and the chiller 76 are not disposed.

In other words, the second passage 20 may be configured of the seventh passage 22 in which the second water pump 72, the battery system 74, the cooling water heater 78, and the chiller 76 are disposed, and the eighth passage 24 connected to the seventh passage 22 at the first position P3 and the second position P4 of the second passage 20.

In this case, the seventh passage 22 may be connected to the ninth passage 26 through the chiller 76, and the air conditioning device 80 may be disposed in the ninth passage 26.

In addition, a tenth passage 28 may be connected to the eighth passage 24. The tenth passage 28 may branch off at one position of the eighth passage 24 to be connected to the reservoir tank 58. A one-way valve 90 may be installed in the tenth passage 28.

The one-way valve 90 may be operated to be opened and closed by a controller 100 to control the flow of the cooling water between the eighth passage 24 and the reservoir tank 58. Specifically, the one-way valve 90 is operated to be closed when the electric power system component 54 and the battery system 74 are cooled or heated and is operated to be opened when the cooling water is injected.

For example, when the cooling water is re-injected into a cooling water circuit of the thermal management system, the one-way valve 90 is operated to be opened. When a component of the thermal management system is replaced, the cooling water is removed from the cooling water circuit, and after the component is replaced, the cooling water is re-injected into the cooling water circuit. When the cooling water is re-injected into the thermal management system, the water pumps 52 and 72 are operated in a state in which the one-way valve 90 and a three-way valve 60 are opened and, when the injection of the cooling water is completed, the one-way valve 90 is closed.

Meanwhile, the three-way valve 60 is installed at a connection position between the first passage 10 and the fourth passage 40. In other words, the three-way valve 60 is installed at the second position P2 of the first passage 10.

The three-way valve 60 is configured to control the cooling water flow direction at the connection position between the first passage 10 and the fourth passage 40. To this end, the three-way valve 60 is provided with three ports 61, 62, and 63 for the entry and exit of the cooling water. Specifically, the three-way valve 60 includes a first port 61 communicating with the fifth passage 12, a second port 62 communicating with the sixth passage 14, and a third port 63 communicating with the fourth passage 40. When opened, the first port 61, the second port 62, and the third port 63 communicate with each other to allow the cooling water to flow. When closed, the first port 61, the second port 62, and the third port 63 block the entry and exit of the cooling water.

An operation of the three-way valve 60 may be controlled by the controller 100 mounted in the vehicle. In the three-way valve 60, in order to allow the cooling water to flow, two or more ports among the first port 61, the second port 62, and the third port 63 may be opened.

The controller 100 may control the operation of the three-way valve 60 according to a thermal management mode of the electric power system of the thermal management system. The controller 100 may control the operation of the three-way valve 60 according to the thermal management mode of the electric power system to determine a flow direction of the cooling water at the connection position between the first passage 10 and the fourth passage 40 (i.e., at the second position P2 of the first passage 10).

The thermal management mode of the electric power system includes an integrated mode and a separation mode. That is, the thermal management mode of the electric power system may be divided into the integrated mode and the separation mode.

Figure 2:
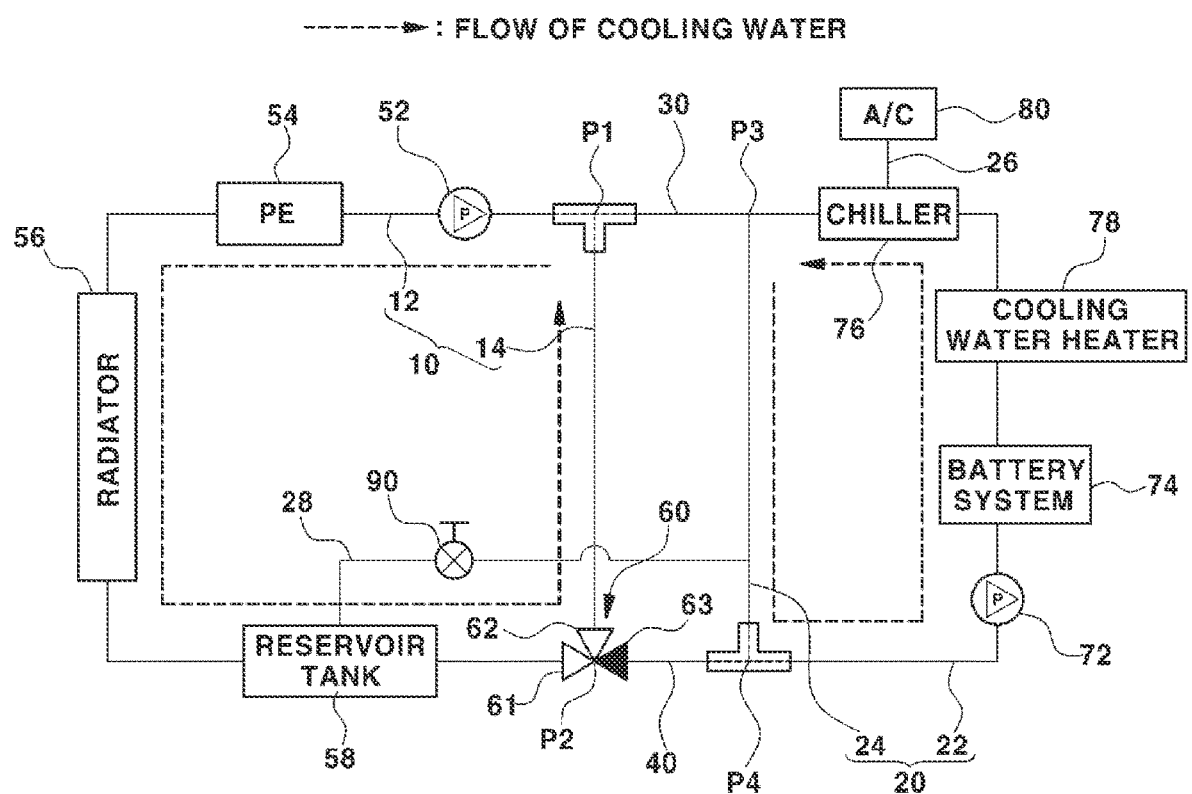
FIG. 2 is a diagram illustrating a flow of cooling water according to a separation mode of the thermal management system according to one form of the present disclosure.
Figure 3:
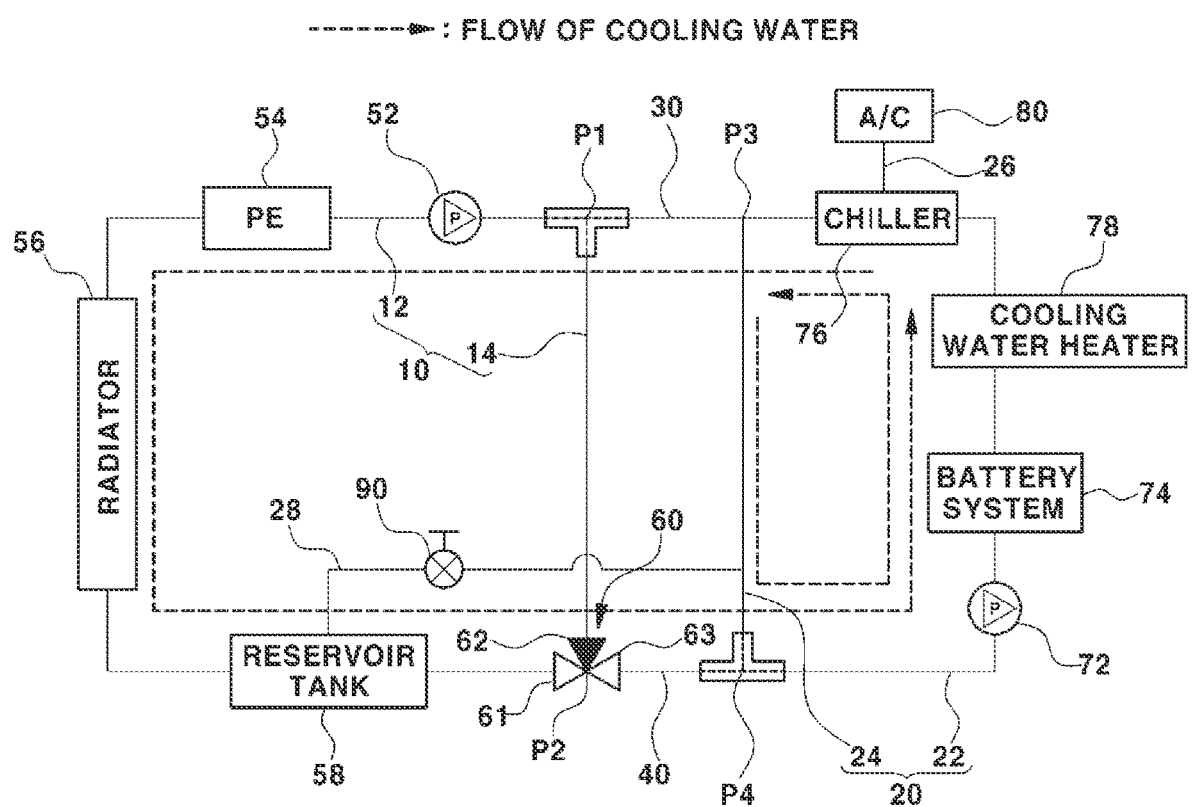
FIG. 3 is a diagram illustrating a flow of the cooling water according to an integrated mode of the thermal management system according to one form of the present disclosure.

FIG. 2 is a diagram illustrating a flow of the cooling water according to the separation mode of the thermal management system, and FIG. 3 is a diagram illustrating a flow of the cooling water according to the integrated mode of the thermal management system.

As shown in FIG. 2, when the flow of the cooling water in the thermal management system is controlled in the separation mode, circulation flows of the cooling water separately occur in the first passage 10 and the second passage 20. Specifically, the flow of the cooling water occurs in the first passage 10 due to the first water pump 52, and the flow of the cooling water occurs in the second passage 20 due to the second water pump 72. In this case, the flow of the cooling water does not occur in the third passage 30 and the fourth passage 40.

More specifically, a flow of the cooling water may occur in the first passage 10 to circulate in the order of the first water pump 52→the electric power system component 54→the radiator 56→the reservoir tank 58→the three-way valve 60→the first water pump 52, and a flow of the cooling water may occur in the second passage 20 to circulate in the order of the second water pump 72→the battery system 74→the cooling water heater 78→the chiller 76→the second water pump 72. In this case, the cooling water flows in the electric power system component 54 and the battery system 74 always.

In addition, in this case, a flow of the cooling water from the first position P3 of the second passage 20 to the first position P1 of the first passage 10 does not occur, and a flow of the cooling water from the second position P2 of the first passage 10 to the second position P4 of the second passage 20 is blocked.

In order for such flows of the cooling water, the three-way valve 60 is operated to open the first port 61 and the second port 62 and close the third port 63. That is, when the three-way valve 60 is controlled in the separation mode by the controller 100, the three-way valve 60 opens the first port 61 and the second port 62 and closes the third port 63. In this case, the one-way valve 90 is operated in a closed mode by the controller 100 to block a flow of the cooling water in the tenth passage 28.

In addition, as shown in FIG. 3, when the flow of the cooling water in the thermal management system is controlled in the integrated mode, an integrated circulation flow of the cooling water occurs in the first passage 10 and the second passage 20.

Specifically, when the thermal management system is controlled in the integrated mode of the cooling water, a flow of the cooling water occurs to circulate in the order of the fifth passage 12, the fourth passage 40, the seventh passage 22, and the third passage 30 due to the water pumps 52 and 72. In this case, the cooling water is blocked from flowing so that a flow of the cooling water does not occur in the sixth passage 14, and a flow of the cooling water occurs in the eighth passage 24.

More specifically, in the thermal management system, a flow of the cooling water occurs to circulate in the order of the first water pump 52→the electric power system component 54→the radiator 56→the reservoir tank 58→the three-way valve 60→the second water pump 72→the battery system 74→the cooling water heater 78→the chiller 76→the first water pump 52, and a flow of the cooling water branching off from the rear end of the chiller 76 (i.e., the first position P3 of the second passage 20) to the eighth passage 24 occurs.

Thus, a portion of the cooling water of the thermal management system forms a first flow of the cooling water circulating in the order of the first water pump 52→the electric power system component 54→the radiator 56→the reservoir tank 58→the three-way valve 60→the second water pump 72→the battery system 74→the cooling water heater 78→the chiller 76→the first water pump 52, and the remaining of the cooling water in the thermal management system forms a second flow of the cooling water circulating in the order of the second water pump 72→the battery system 74→the cooling water heater 78→the chiller 76→the second water pump 72. In this case, the electric power system component 54 and the battery system 74 are connected in series based on the first flow of the cooling water passing through the radiator 56, and the cooling water flows in the electric power system component 54 and the battery system 74 always. In addition, in this case, the cooling water according to the second flow does not pass through the electric power system component 54 and the radiator 56.

In order for such flows of the cooling water, the three-way valve 60 is operated to open the first port 61 and the third port 63 and close the second port 62. That is, when the three-way valve 60 is controlled in the integrated mode by the controller 100, the three-way valve 60 opens the first port 61 and the third port 63 and closes the second port 62. Consequently, a flow of the cooling water is allowed from the first position P3 of the second passage 20 to the first position P1 of the first passage 10, a flow of the cooling water is allowed from the second position P2 of the first passage 10 to the second position P4 of the second passage 20, and a flow of the cooling water is allowed from the first position P3 of the second passage 20 to the second position P4 of the second passage 20. In addition, in this case, the one-way valve 90 is operated in the closed mode.

More specifically, when the three-way valve 60 is controlled to be operated in the integrated mode, the entirety of the cooling water passing through the radiator 56 passes through the battery system 74, a portion of the cooling water at the first position P3 of the second passage 20 flows to the battery system 74, and the remainder of the cooling water at the first position P3 of the second passage 20 flows to the radiator 56 via the electric power system component 54.

Therefore, when the thermal management system is controlled in the separation mode, the electric power system component 54 may be cooled in the first passage 10 using the radiator 56, and the battery system 74 may be cooled in the second passage 20 using the chiller 76. In addition, the battery system 74 may be even heated in the second passage 20 using the cooling water heater 78.

In addition, when the thermal management system is controlled in the integrated mode, the electric power system component 54 and the battery system 74 may be cooled using at least one of the radiator 56 and the chiller 76. Further, the electric power system component 54 and the battery system 74 may be even heated using the cooling water heater 78.

In addition, when the thermal management system is controlled in the separation mode, a driving speed of each of the first water pump 52 and the second water pump 72 may be controlled by the controller 100. For example, the first water pump 52 and the second water pump 72 may be driven at different speeds or at the same speed.

In addition, when the thermal management system is controlled in the integrated mode, in response to extension in flow path of the cooling water, a driving speed rpm1 of the first water pump 52 may be controlled to be a speed value rpm2+α obtained by adding a reference speed α to a driving speed rpm2 of the second water pump 72. Here, the reference speed α may be determined as a speed value derived through a pre-test and evaluation.

Meanwhile, when the cooling water is injected into the reservoir tank 58, the one-way valve 90 is operated to be opened to allow the cooling water to flow in the tenth passage 28. When the cooling water is injected into the reservoir tank 58, the cooling water is filled in not only the reservoir tank 58 but also all the passages of the cooling water in the thermal management system. Thus, the electric power system component 54 and the battery system 74 may be maintained always in a state which is capable of performing heat exchange by being in contact with the cooling water.

As in a conventional thermal management system to which two three-way valves are applied, the thermal management system of a vehicle electric power system of the present disclosure, which is configured as described above, may control the flow of the cooling water in the integrated mode and the separation mode even using only one three-way valve 60.

Consequently, the thermal management system of the present disclosure has an advantage which is capable of securing cooling and heating performances equivalent to those of the conventional thermal management system and allowing a production cost to be reduced as compared with the conventional thermal management system.

The present disclosure may provide the following effects.

First, even when only one three-way valve is used, a flow of cooling water can be controlled in an integrated mode and a separation mode as in a conventional thermal management system to which two three-way valves are applied.

Second, forms of the present disclosure are capable of securing cooling and heating performances equivalent to those of the conventional thermal management system to which two three-way valves are applied and allowing a production cost to be reduced compared to the conventional thermal management system.

Although various forms of the present disclosure have been described in detail, the terms or words used in the specification and the appended claims should not be construed as being limited to ordinary or dictionary meanings, and since the forms described herein and the configurations shown in the accompanying drawings are only exemplary so that the scope of the prevent disclosure is not limited to these forms, and various modifications and improvements devised by those skilled in the art using the fundamental concept of the present disclosure, which is defined by the appended claims, further fall within the scope of the present disclosure.

What is claimed is:

1. A thermal management system of a vehicle electric power system, the thermal management system comprising:
   a first passage including a fifth passage and a sixth passage that are defined based on a first position and a second position of a cooling water flow direction, wherein the fifth passage includes an electric power system component, a radiator, and a first water pump disposed therein;
   a second passage including a seventh passage and an eighth passage which are defined based on a first position and a second position of the cooling water flow direction, wherein the seventh passage includes a battery system, a chiller, and a second water pump disposed therein;
   a third passage configured to connect the first position of the first passage to the first position of the second passage and allow cooling water to flow between the first passage and the second passage;

a fourth passage configured to connect the second position of the first passage to the second position of the second passage and allow the cooling water to flow between the first passage and the second passage;

a three-way valve installed at a connection position between the first passage and the fourth passage and configured to control the cooling water flow direction;

a tenth passage branching off from the eighth passage and configured to be connected to a reservoir tank, wherein the reservoir tank configured to store the cooling water is installed in the fifth passage;

a one-way valve disposed in the tenth passage; and a controller configured to determine the cooling water flow direction and control the three-way valve based on a thermal management mode of an electric power system, wherein the controller is further configured to control the one-way valve and a flow of the cooling water between the eighth passage and the reservoir tank.

2. The thermal management system of claim 1, wherein the first passage is configured to allow the cooling water to circulate to the electric power system component and the radiator by the first water pump.

3. The thermal management system of claim 1, wherein the second passage is configured to allow the cooling water to circulate to the battery system and the chiller by the second water pump.

4. The thermal management system of claim 1, wherein a cooling water heater configured to heat the cooling water is installed in the seventh passage.

5. The thermal management system of claim 1, wherein a ninth passage is connected to the seventh passage through the chiller and includes an air conditioning device disposed therein.

6. The thermal management system of claim 1, wherein the three-way valve includes a first port configured to communicate with the fifth passage, a second port configured to communicate with the sixth passage, and a third port configured to communicate with the fourth passage.

7. The thermal management system of claim 6, wherein the thermal management mode of the electric power system includes an integrated mode and a separation mode, and when the controller controls the three-way valve in the integrated mode, the three-way valve opens the first port and the third port and closes the second port.

8. The thermal management system of claim 7, wherein when the first port and the third port are opened and the second port is closed, the cooling water is allowed to flow from the first position of the second passage to the first position of the first passage, and to flow from the second position of the first passage to the second position of the second passage.

9. The thermal management system of claim 8, wherein when the first port and the third port are opened and the second port is closed, the flow of the cooling water branches off from the first position of the second passage to the eighth passage.

10. The thermal management system of claim 7, wherein when the controller controls the three-way valve in the separation mode, the three-way valve opens the first port and the second port and closes the third port.

11. The thermal management system of claim 10, wherein when the first port and the second port are opened and the third port is closed, the cooling water does not flow in the third passage and the fourth passage.

12. The thermal management system of claim 7, wherein when the controller controls the three-way valve in the integrated mode, the controller is configured to operate the one-way valve to be closed and block the flow of the cooling water in the tenth passage.

13. The thermal management system of claim 10, wherein in the separation mode, the controller is configured to control the one-way valve to be closed and block the flow of the cooling water in the tenth passage.

14. The thermal management system of claim 1, wherein when the cooling water is injected into the reservoir tank, the controller is configured to control the one-way valve to be opened and allow the flow of the cooling water in the tenth passage.

15. The thermal management system of claim 7, wherein in the integrated mode, the controller is configured to control a speed of the first water pump with a speed value obtained by adding a set reference speed to a speed of the second water pump.

16. The thermal management system of claim 10, wherein in the separation mode, the controller is configured to individually control a speed of the first water pump and a speed of the second water pump.

* * * * *